Feb. 23, 1937.　　　　E. C. BRISBANE　　　　2,071,814
VALVE
Filed May 17, 1934　　　　2 Sheets-Sheet 1

INVENTOR
EUGENE C. BRISBANE
BY
ATTORNEY

Feb. 23, 1937.　　　E. C. BRISBANE　　　2,071,814
VALVE
Filed May 17, 1934　　　2 Sheets-Sheet 2
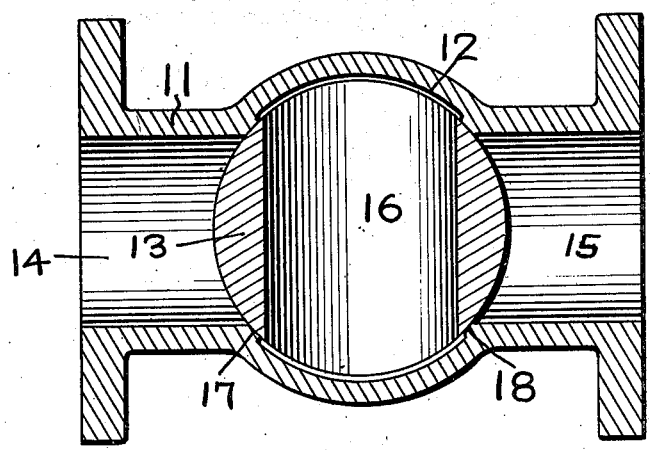
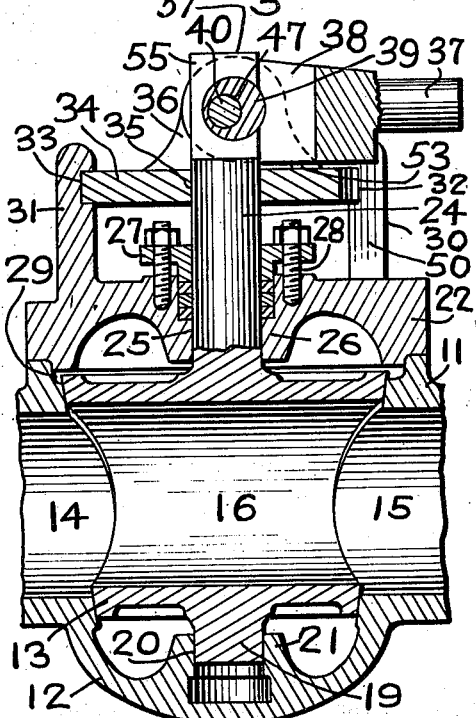
INVENTOR
EUGENE C. BRISBANE
BY Malcolm J. Gannett
ATTORNEY Patented Feb. 23, 1937

2,071,814

UNITED STATES PATENT OFFICE 2,071,814

VALVE

Eugene C. Brisbane, York, Pa., assignor to S. Morgan Smith Company, York, Pa., a corporation of Pennsylvania Application May 17, 1934, Serial No. 726,027

3 Claims. (Cl. 251—97)

This invention relates to multiple-way and straight-way valves for controlling the transmission of fluids, and more particularly to taper plug valves.

An object of the invention is to provide an improved manually operable taper plug valve, in which means are provided for first raising the plug from its seat, then rotating the plug to either an opened or closed position, and then reseating the plug.

Another object of the invention is to provide an improved manually operable taper plug valve, in which the stem of the plug is connected to the operating means by an eccentric.

Another object of the invention is to provide an improved taper plug valve in which the plug operating mechanism includes a leverage mechanism which is operable to first unwedge the plug from its seat thus making the plug easy to turn, and then to re-wedge the plug after the plug has been rotated to either an opened or closed position.

Another object of the invention is to provide an improved valve of the character mentioned, which is simple in construction, and reliable and exact in function under all conditions of service.

The invention also comprises certain new and useful improvements in the construction, arrangement and combination of the several parts of which it is composed, as will be hereinafter more fully described and claimed.

In the accompanying drawings:—

Fig. 3 is a longitudinal section taken on the line 3—3 of Fig. 1, the plug being shown in closed position;

Fig. 4 is a vertical transverse section taken on the line 4—4 of Fig. 1; and

Fig. 5 is a view similar to Fig. 1 showing the plug of the valve unwedged, preparatory to turning the plug from open to closed position.

Figure 1:
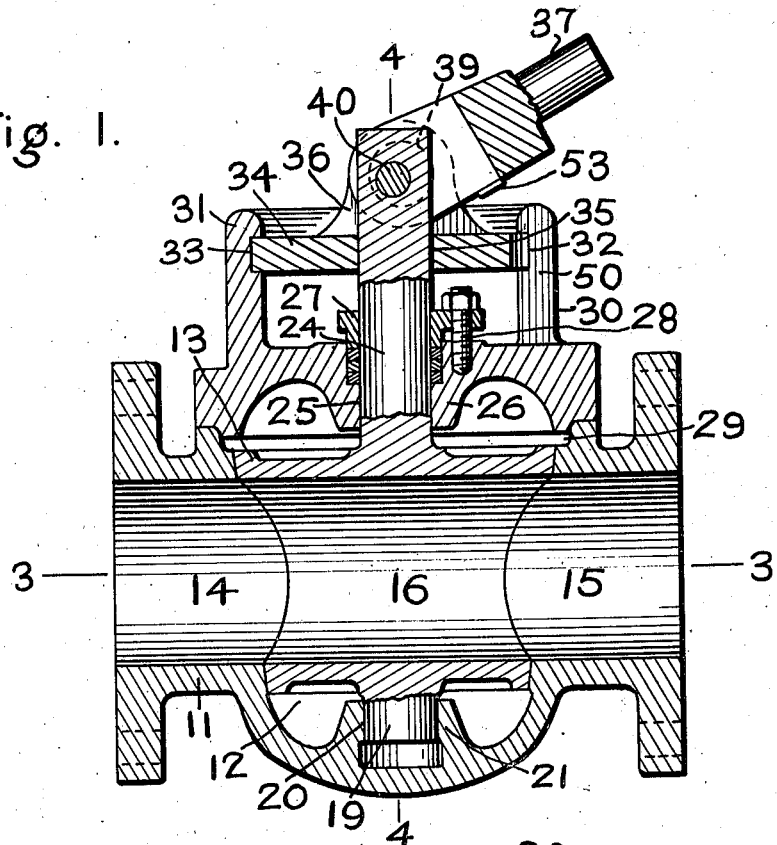
Figure 1 is a vertical longitudinal section through a taper plug valve embodying the invention, the plug being shown in open position.

The drawings illustrate a straight-way valve, but the improvements are equally applicable to three or four way, elbow and angle valves.

Referring to the drawings, the improved valve comprises a main body or casing 11 having a cavity 12 formed therein for a tapered plug 13, the cavity being intersected by a longitudinal water way or opening which constitutes passages 14, 15 through the valve, the passage 14 being on one side of the cavity 12 and the passage 15 being on the other side of said cavity. The plug 13 also has a passage 16 formed therein. The passages 14, 15 and 16 are round, as shown in Fig. 4 and all are of the same diameter, so that when the plug 13 is in the open position shown in Fig. 1, a uniform bore will extend through the valve from end to end.

At the point where the passage 14 meets the adjacent wall of the cavity 12, there is an annular rib 17. Likewise there is an annular rib 18 formed at the intersection of the passage 15 with the adjacent wall of the cavity 13 (see Fig. 3). The outer surfaces of the ribs 17 and 18 are finished smooth.

The outer surface of the tapered plug 13 is finished smooth and this outer surface portion of the plug is adapted to seal against the smooth outer surfaces of the ribs 17 and 18, so as to form a tight joint between the plug and the casing, when the plug is in the open position shown in Fig. 3. When the plug is seated, it has a wedge fit in the casing as will be understood.

At its lower end the plug 13 is formed with an extension which constitutes a trunnion 19. The trunnion 19 is slidably, as well as rotatably mounted in a bore 20 in a boss 21 formed on the bottom portion of the casing 11.

The top of the casing 11 is formed with an opening 29 which is large enough in area to permit the insertion or removal of the plug 13. The opening 29 is closed by means of a cover plate or cap 22, which is detachably secured to the casing by means of bolts 23.

Projecting upwardly from the top of the plug 13, is a stem 24 which passes through an opening 25 in a boss 26 formed on the cover plate or cap 22. The upper extremity 57 of the valve stem 24 is formed with opposed flat surfaces 55, the purpose of which will be hereinafter described.

A packing gland 27 surrounds the stem 24 and is detachably secured to the cover plate or cap 23 by cap screws or the like 28, as shown in Figs. 1 and 5.

Projecting upwardly from the top of the cover plate or cap 23 is a pair of diametrically disposed arcuate standards 30, 31, which are, respectively, formed near their top portions with substantially horizontal slots or grooves 32, 33.

Rotatably mounted in the grooves 32, 33 of the standards 30, 31 and supported by said standards, is a disk or plate 34 having a bore 35 formed centrally therein through which the upper portion the valve stem 24 extends.

Figure 2:
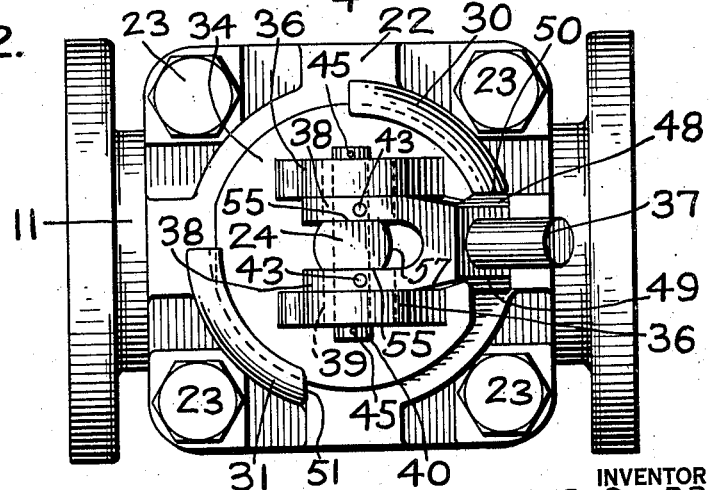
Fig. 2 is a plan of the structure shown in Fig. 1.

The disk or plate 34 forms a part of the operating mechanism for the valve, and said disk or plate is provided with a pair of upstanding ears 36 which are disposed on opposite sides of the valve stem 24 in spaced relation thereto, as shown best in Figs. 2 and 4.

An operating lever 37 having a forked end with a pair of arms 38 which straddle the upper portion 57 of the valve stem 24, is operatively connected to said stem 24 by means of bushings 39 and a pin or rod 40.

The bushings 39 are mounted in openings 41, 42 formed, respectively, in the ears 36 and the arms 38.

Each bushing 39 is held in position by means of a headless set screw 43 which is threaded in an opening 44 formed in the arm 38, and the pin or rod is held in position by pins 45 at each end thereof, as shown in Fig. 4.

The bushings 39 are formed with openings 47 through which the pin or rod 40 is passed. As shown in Fig. 5 the openings are off center with respect to the center of the bushings 39 so that the rod or pin 40 will be eccentrically disposed with respect to the bushings.

It will thus be noted that the manner of connecting the lever 37 with the upper end of the valve stem 24 is such that the bushings 39 are free to rotate in the ears 36, but said bushings are prevented from rotating in the ends of the lever arms 38. In this way the bushings 39 constitute trunnions for the lever 37 and due to the eccentric disposition of the pin or rod 40 therein, when the lever 37 is raised or lowered, the stem 24 will also be raised or lowered.

As shown in Fig. 2, the opposite sides of the lever 37 are formed with portions 48, 49 which are adapted to abut the end walls 50, 51 respectively, of the standards 30, 31.

When the plug is in open position in which the passage 16 therein alines with the passages 14, 15 of the casing 11, the portion 48 of the lever 37 abuts the end wall 50 of the standard 30. On the other hand, when the plug is turned to cut off communication through the valve, to the position shown by Fig. 3, the portion 49 of the lever 37 will abut the end wall 51 of the standard 31. In this way the sides of the lever 37 cooperate with the end walls 50, 51 of the standards 30, 31, respectively, to maintain the plug 13 in either open or closed position.

In operation, assuming that the valve is in open position shown in Fig. 1 and it is desired to close the valve as shown in Fig. 3, the operating lever 37 is first downwardly moved from the position shown in Fig. 1 to the position shown in Fig. 5, in which latter position a pad 53 on the underside of the lever abuts the upper surface of the disc or plate 34. This action lifts the plug 13 from its seat against the ribs 17, 18 and thereby unwedges the plug so that it is free to rotate. With the lever 37 still in the position shown in Fig. 5 the same is moved in a clockwise direction (Fig. 2) and this action rotates the disc or plate 34 and the parts carried thereon and since the valve stem is connected to the lever 37 in the manner heretofore described the plug 13 will also be rotated. Rotary movement of the parts will be arrested when the portion 49 of the lever abuts the end wall 51 of the standard 31, after which the lever is raised from the position shown in Fig. 5 to the position shown in Fig. 1 and this action lowers the plug 13 and seals the same against the ribs 17, 18, as shown in Fig. 3, due to the eccentric mounting of the pin or rod 40 in the bushing 39.

Having thus described my invention what I claim is:—

1. A valve comprising a body having a seat formed therein, a tapered plug cooperating with said seat for controlling communication through the valve, a stem fixed to said plug and projecting through one side of the valve body, a pair of diametrically disposed upwardly projecting standards rigidly fixed to the valve body, said standards being arcuate in cross section and surrounding the valve stem, a disk rotatably mounted between said standards, a lever carried by said disk, means for eccentrically pivotally connecting said lever with said valve stem, whereby operation of said lever in a vertical plane effects bodily movement of said plug away from and towards said seat and movement of said lever in a horizontal plane turns said plug on its own axis, and means formed on said lever for engaging said standards for limiting the horizontal movement of said lever in the space between said standards.

2. The combination of a valve casing having a passage therethrough and a valve seat, a plug in said casing cooperating with said seat and adapted to control communication through said passage, a pair of diametrically disposed upwardly projecting standards fixed to the casing, a disk rotatably mounted between said standards, said plug having a stem projecting through said casing and said disk, an operating lever movable about horizontal and vertical axes, and means for pivotally connecting said lever to said disk and said stem, said lever having the combined function of first moving said stem and said plug independently with respect to the disk to unseat the plug when moved downwardly about the horizontal axis, of then rotating the disk and the plug simultaneously to open or close the passage through the valve casing when moved about the vertical axis, and of then moving said stem and said plug independently with respect to the disk to reseat the plug in either open or closed position when moved upwardly about the horizontal axis, the movement of said lever about the vertical axis being limited by said fixed standards on the opening and closing of the valve, and the movement of said lever about the horizontal axis being limited by said disk.

3. The combination of a valve casing having a passage therethrough and a valve seat, a plug in said casing cooperating with said seat and adapted to control communication through said passage, a pair of standards fixed to said casing, a disk rotatably mounted between said standards, said plug having a stem projecting through said casing and said disk, an operating lever carried by said disk and operating between said standards to open and close the valve, and means for eccentrically connecting said lever to said stem, said lever having the combined function of first moving said stem and said plug independently with respect to the disk to unseat the plug when moved downwardly in a vertical plane, of then rotating the disk and the plug simultaneously to open or close the passage through the valve casing when moved in a horizontal plane, and of then moving said stem and said plug independently with respect to the disk to reseat the plug in either open or closed position when moved upwardly in a vertical plane, the movement of said lever about the vertical axis being limited by said fixed standards on the opening and closing of the valve, and the movement of said lever about the horizontal axis being limited by said disk.

EUGENE C. BRISBANE.